United States Patent
Chutorash (12)

(10) Patent No.: US 6,411,884 B1
(45) Date of Patent: *Jun. 25, 2002

(54) AUTO PC MODULE ENCLOSURE

(75) Inventor: Richard Joseph Chutorash, Rochester Hills, MI (US)

(73) Assignee: Lear Automotive Dearborn, Inc., Southfield, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,306

(22) Filed: Sep. 28, 1998

(51) Int. Cl.$^7$ .............................. G06F 19/00; G06G 7/70
(52) U.S. Cl. ........................ 701/102; 701/115; 361/730
(58) Field of Search ................................. 361/681, 683, 361/728, 729, 730; 312/223.2; 701/102, 115, 33, 29

(56) References Cited

U.S. PATENT DOCUMENTS

| | | | |
|---|---|---|---|
| 5,337,464 A | | 8/1994 | Steffes |
| 5,379,057 A | * | 1/1995 | Clough et al. ............... 345/173 |
| 5,446,665 A | * | 8/1995 | Adrian et al. ........... 364/431.04 |
| 5,493,194 A | | 2/1996 | Damiano et al. |
| 5,546,273 A | * | 8/1996 | Harris ......................... 361/697 |
| 5,808,866 A | | 9/1998 | Porter |
| 5,898,774 A | * | 4/1999 | Shindo ....................... 379/433 |
| 5,914,854 A | | 6/1999 | Holt |
| 5,947,570 A | * | 9/1999 | Anderson et al. ........ 312/223.3 |
| 5,979,396 A | * | 11/1999 | Yasuoka ..................... 123/295 |
| 6,014,319 A | * | 1/2000 | Kuchta et al. .............. 361/788 |
| 6,112,152 A | * | 8/2000 | Tuttle ......................... 701/115 |

OTHER PUBLICATIONS

Michael L. Hafften et al., "Venis—A Real–Time Distributed Prototype System" Proceedings of the Midwest Symposium on Circuits and Systems, U.S., New York, IEEE, Wol. Symp. 36, 1993, pp. 364–367, XP000499447.
P. 364, col. 1, line 52—p. 365, col. 1, line 12; p. 365, col. 1, line 32–line 52; p. 3635, col. 2, line 1—line 39 Figures 5A–5C.
"Focus on Electronics" Automotive Engineer, GB, Mechanical Engineering Publ. Ltd. Bury St. Edmunds, vol. 22, No. 5, Jun. 1, 1997 pp. 36–38, 41–42, 45, XPooo691163 ISSN: 0307–6490, the whole document.

* cited by examiner

Primary Examiner—Lynn D. Feild
(74) Attorney, Agent, or Firm—Brooks & Kushman P.C.

(57) ABSTRACT

An enclosure for a vehicle computer system module is disclosed. The enclosure permits a plurality of computer system modules of the vehicle system computer to be releasably mounted within the enclosure. A plurality of user input devices are connected through the enclosure with the computer system modules. The user input devices permit a user to exchange data with the computer system modules. The enclosure permits vehicle system computer modules to be rapidly repaired and upgraded in a modular fashion.

25 Claims, 2 Drawing Sheets

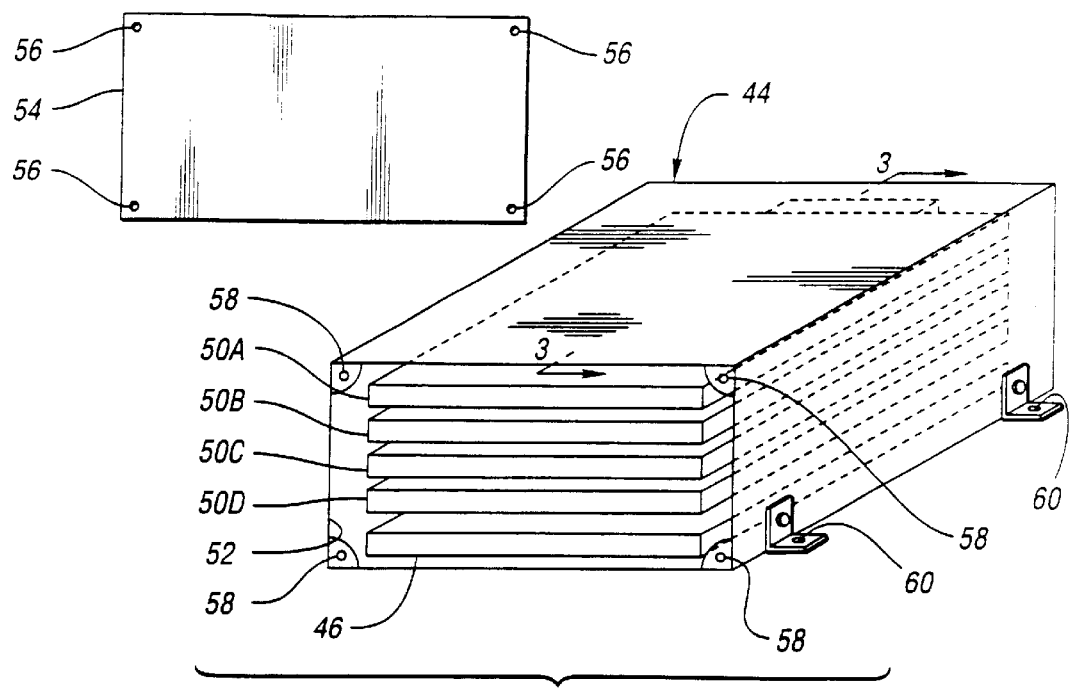
*Fig. 2*
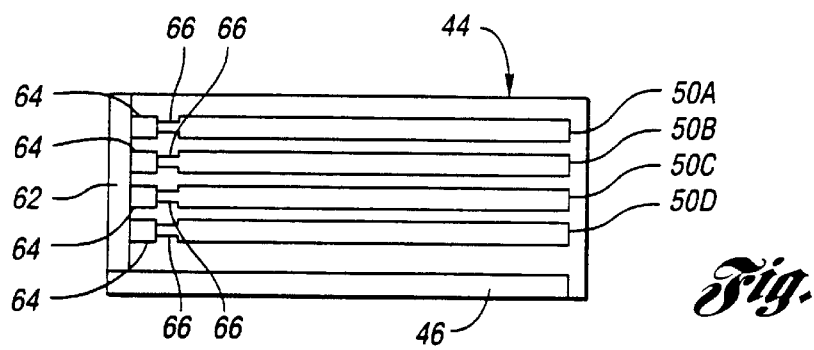
*Fig. 3*
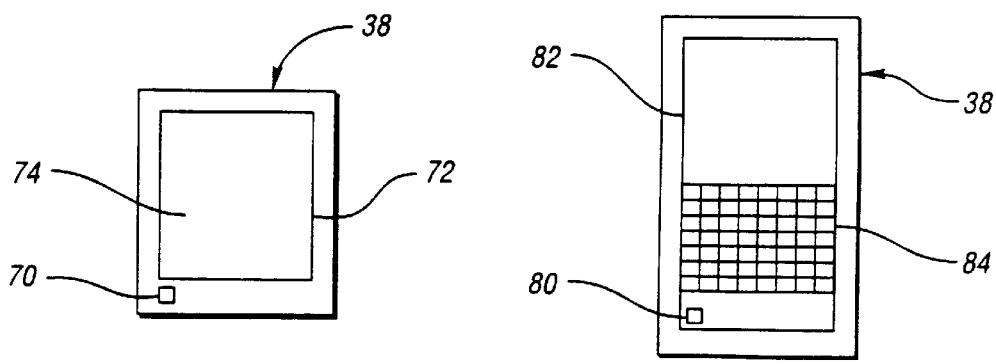
*Fig. 4*          *Fig. 5*

AUTO PC MODULE ENCLOSURE

BACKGROUND OF THE INVENTION

This invention relates generally to a vehicle computer system and, more particularly, to a vehicle computer system having an enclosure for releasably mounting a plurality of computer system modules in the enclosure.

Vehicle computer systems have typically been used to control engine functions and for diagnostic analysis. In the past, these vehicle computer systems have not been upgradable and were designed to be replaced if they failed.

Advances in computer technology have made it possible to incorporate more functions into the vehicle computer system. In addition, there is increased demand to provide a vehicle computer system that is readily accessible to technicians for repair and upgrading of the vehicle computer system. It is also it desirable to design a vehicle computer system that can be accessed and utilized by a user of the vehicle.

Because of the harsh environment of a vehicle, it is necessary to design an enclosure for a vehicle computer system that maintains the integrity of the vehicle computer system while allowing access to the vehicle computer system by technicians and users of the vehicle. It is furthermore desirable to provide an enclosure for a vehicle computer system that can accommodate computer system modules wherein the computer system modules are similar to video game cartridges and contain a variety of software. It is desirable to enable these computer system modules to be releasably mounted in the enclosure, this permits easy repairs and upgrading of a computer system module.

SUMMARY OF THE INVENTION

In general terms, this invention provides an enclosure for a vehicle computer system that enables a plurality of computer system modules of the vehicle computer system to be releasably mounted securely within the enclosure.

In one embodiment the enclosure for a vehicle computer system module comprises an enclosure that is adapted to be mounted in a vehicle. The enclosure includes at least one signal power bus mounted in the enclosure, with the signal power bus connected to a central processing unit, also mounted in the enclosure. The enclosure releasably mounts at least one computer system module that is electrically connected to the signal power bus. Preferably, the enclosure is mounted to the vehicle. Most preferably the enclosure includes a plurality of first electrical connectors that are each adapted to engage a second electrical connector on each computer system module. The first electrical connectors releasably mount a computer system module in the enclosure.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 2 is a perspective view of the enclosure and an access panel;

FIG. 3 is a cross-sectional view along line 3—3 of FIG. 2;

FIG. 4 is a top plan view of one embodiment of a user input device designed in accordance with the present invention; and FIG. 5 is a top plan view of another embodiment of a user input device designed in accordance with the present invention.

DETAILED DESCRIPTION OF THE PREFERRED EMBODIMENT

Figure 1:
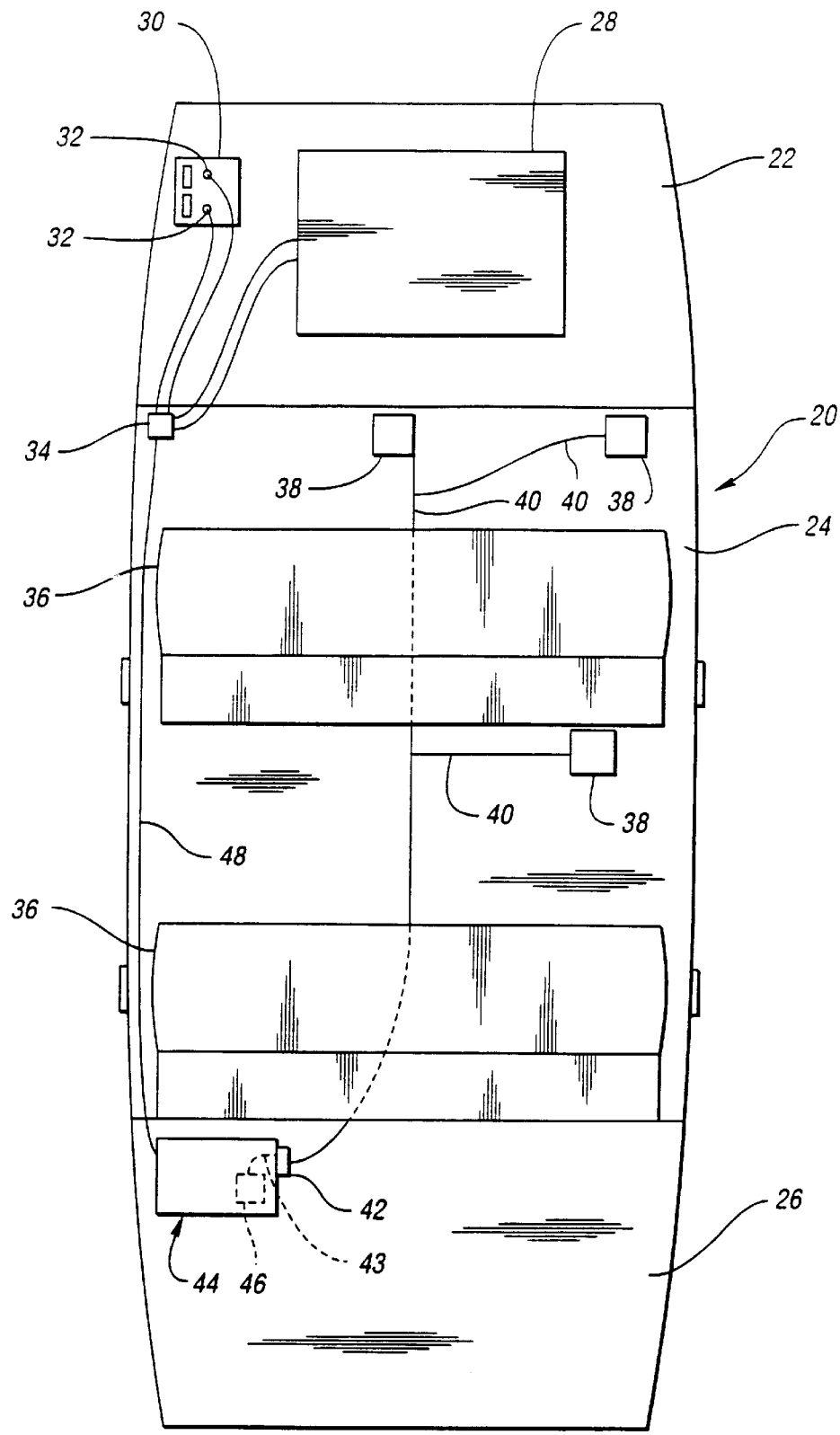
FIG. 1 is a top plan schematic view of a vehicle incorporating an enclosure designed in accordance with the present invention.

A top plan schematic view of a vehicle is generally shown at 20 in FIG. 1. Vehicle 20 includes an engine compartment 22, a passenger compartment 24, and a trunk 26. An engine 28 is mounted in engine compartment 22 and connected to an electrical power supply 30. Typically, electrical power supply 30 comprises a battery having a plurality of terminals 32. Electrical power supply 30 is connected to a fuse box 34, preferably mounted within passenger compartment 24. Electrical power is distributed from fuse box 34 throughout vehicle 20.

Passenger compartment 24 includes a plurality of seats 36. A plurality of user input devices 38 are mounted within passenger compartment 24 and each is viewable from one of seats 36. A data transmission connection 40 connects user input devices 38 with a communication port 42. Communication port 42 is connected to an enclosure 44 containing a central processing unit 46 of the vehicle computer system. An electrical connection 43 connects communication port 42 to central processing unit 46.

Preferably, enclosure 44 is mounted within trunk 26. As will be understood by one having ordinary skill in the art, enclosure 44 could be mounted elsewhere within vehicle 20. A power feed 48 supplies electrical power from fuse box 34 to enclosure 44.

As shown in FIG. 2, enclosure 44 accommodates a plurality of computer system modules 50 A–D that are mounted within an interior space 52 inside enclosure 44. Computer system modules 50 A–D are designed similar to video game cartridges. Typically, computer system modules 50 A–D are self-contained modules having software and hardware that can be used to perform a variety of functions. For example, module 50 A may be an engine control and monitoring system. Module 50 B may be a vehicle climate control system and vehicle component adjustment system that permits users to select seat adjustments, audio, temperature and other settings. Module 50C may be a multimedia interactive system that could include games and provide wireless internet access. Modules 50 A–D are releasably mounted within enclosure 44. Enclosure 44 further includes an access panel 54 that is releasably secured to enclosure 44 by a plurality of fasteners 56. Fasteners 56 comprise bolts that are received in a plurality of holes 58 in enclosure 44. Fasteners 56 may comprise fasteners other than bolts as is known in the art. Enclosure 44 further includes means for mounting enclosure 44 to vehicle 20. By way of example, enclosure 44 is shown with a plurality of brackets 60 that can be used to mount enclosure 44 to vehicle 20.

FIG. 3 is a cross-sectional view along line 3—3 of FIG. 2. Enclosure 44 includes a signal power bus 62 that is mounted to enclosure 44. Signal power bus 62 is electrically connected to central processing unit 46 and a plurality of first electrical connectors 64. Each of the computer system modules 50 A–D include a second electrical connector 66. First electrical connectors 64 are adapted to engage second electrical connectors 66 and thus, provide an electrical connection between computer system modules 50 A–D and signal power bus 62. Typically one of first electrical connectors 64 or second electrical connectors 66 comprise a female electrical connector and the other comprises a male electrical connector. First electrical connectors 64 releasably mount computer system modules 50 A–D within enclosure 44. Preferably, first electrical connectors 64 and second electrical connectors 66 are pin-type computer connections that are well known in the art. Preferably, computer system modules 50 A–D are sealed modules similar to video game cartridges. Once mounted in enclosure 44, each computer system module 50 A–D would be accessible through one of the user input devices 38.

FIGS. 4 and 5 are top plan views of two embodiments of input device 38. In FIG. 4, input device 38 includes a power button 70, a display 72, and a touch sensitive screen 74. Through data transmission connection 40, a user of the user input device 38 can exchange data with computer system modules 50 A–D and central processing unit 46. Touch sensitive screen 74 is known in the art. In FIG. 5 an alternative embodiment of user input device 38 is shown. In this embodiment, user input device 38 includes a power button 80, a display 82, and a keypad 84. Keypad 84 permits a user to exchange data with computer system modules 50 A–D and central processing unit 36 through data transmission connection 40. Using input device 38 a user is able to exchange data with one of the computer system modules 50 A–D. The data exchanged may comprise, for example, seat settings, climate control settings, audio system settings, engine diagnostics, internet data, or game information.

As described above, preferably computer system modules 50 A–D comprise self-contained modules having a variety of functions provided by software and hardware. The multiple user input devices 38 will permit a plurality of users to access computer system modules 50 A–D. Preferably, first electrical connectors 64 and second electrical connectors 66 are designed to withstand the environment of vehicle 20.

The computer system modules 50 A–D contain the software for a particular function. Thus, the system can be upgraded or repaired by removing a module and inserting a new computer system module. The software within any computer system module may be as is known. As an example, an engine control computer system module can contain software similar to that now used in vehicle computer systems. It is providing the software in the removable computer system module that is the unique aspect.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

I claim:

1. A vehicle computer system comprising:
   an enclosure adapted to be mounted in a vehicle;
   a central processing unit mounted in said enclosure;
   at least one signal power bus mounted in said enclosure and connected to said central processing unit; and
   a computer system module releasably mounted in said enclosure, said computer system module being electrically connected to said signal power bus and including one of a vehicle climate control system and an engine control and monitoring system.

2. The vehicle computer system of claim 1 further comprising:
   a plurality of first electrical connectors, each of said first electrical connectors being electrically connected to said signal power bus; and
   said computer system module including a second electrical connector, said second electrical connector releasably connected to one of said first electrical connectors.

3. The vehicle computer system of claim 2 wherein one of said plurality of first electrical connectors and said second electrical connector is a female electrical connector and the other of said plurality of first electrical connectors and said second electrical connector is a male electrical connector.

4. The vehicle computer system of claim 1 wherein said enclosure further includes a removable access panel, said access panel providing access to said mounted computer system module when said access panel is removed.

5. The vehicle computer system of claim 1 further comprising:
   at least one communication port mounted to said enclosure and electrically connected to said central processing unit;
   at least one user input device mountable in a vehicle; and
   a data transmission connection adapted to be connected between said user input device and said communication port for transmitting data between said user input device and said central processing unit.

6. The vehicle computer system of claim 5 wherein said user input device includes a display having a touch sensitive screen for exchanging data with said central processing unit.

7. An enclosure for a vehicle computer system module as recited in claim 5 wherein said user input device includes a display connected to a keypad, said keypad for exchanging data with said central processing unit.

8. The vehicle computer system of claim 1 further comprising an additional computer system module releasably mounted in said enclosure and electrically connected to said signal power bus, wherein said computer system module includes said vehicle climate control system, and said additional computer system module includes said engine control and monitoring system.

9. The vehicle computer system of claim 1 wherein said computer system module is a sealed module.

10. The vehicle computer system of claim 1 further comprising an additional computer system module releasably mounted in said enclosure and electrically connected to said signal power bus, said additional computer system module including a multimedia interactive system.

11. The vehicle computer system of claim 1 wherein said computer system module includes said vehicle climate control system and a vehicle component adjustment system.

12. A vehicle computer system and vehicle combination comprising:
    a vehicle;
    an enclosure mounted in said vehicle;
    a central processing unit mounted in said enclosure;
    at least one signal power bus mounted in said enclosure and connected to said central processing unit;
    an electrical power supply electrically connected to said signal power bus; and
    a computer system module releasably mounted in said enclosure and electrically connected to said signal power bus, said computer system module including one of an engine control and monitoring system and a vehicle climate control system.

13. The combination of claim 12 further comprising:
    a plurality of first electrical connectors, each of said first electrical connectors being electrically connected to said signal power bus; and said computer system module including a second electrical connector releasably connected to one of said first electrical connectors.

14. The combination of claim 13 wherein each first electrical connector is one of a female electrical connector and a male electrical connector, and said second electrical connector is the other of a female electrical connector and a male electrical connector.

15. The combination of claim 12 wherein said enclosure further includes a removable access panel, said access panel providing access to said mounted computer system module when said access panel is removed.

16. The combination of claim 12 further comprising:
   at least one communication port mounted to said enclosure and electrically connected to said central process unit;
   at least one user input device mounted in said vehicle; and
   a data transmission connection extending between said user input device and said communication port for transmitting data between said user input device and said central processing unit.

17. The combination of claim 16 wherein said user input device includes a display for exchanging data with said central process unit.

18. The combination of claim 16 wherein said user input device includes a display connected to a keypad for exchanging data with said central processing unit.

19. The combination of claim 12 further comprising:
   at least one communication port mounted to said enclosure and electrically connected to said central processing unit;
   a plurality of user input devices mounted at different locations in said vehicle; and
   a data transmission connection extending between said plurality of user input devices and said communication port for transmitting data between said plurality of user input devices and said central processing unit.

20. The combination of claim 12 wherein said vehicle includes a trunk, and said enclosure is mounted in said trunk.

21. The combination of claim 12 wherein said computer system module is a sealed module.

22. The combination of claim 12 further comprising as additional computer system module releasably mounted in said enclosure and electrically connected to said signal power bus, wherein said computer system module includes said engine control and monitoring system, and said additional computer system module includes said vehicle climate control system.

23. The combination of claim 12 further comprising two additional computer system modules releasably mounted in said enclosure and electrically connected to said signal power bus, wherein said computer system module includes said engine control and monitoring system, one of said two additional computer system modules includes said vehicle climate control system, and the other of said two additional computer system modules includes a multimedia interactive system.

24. A vehicle computer system comprising:
   an enclosure adapted to be mounted in a vehicle;
   a central processing unit mounted in said enclosure;
   at least one signal power bus mounted in said enclosure and connected to said central processing unit;
   a plurality of first electrical connectors electrically connected to said signal power bus; and
   a computer system module releasably mounted in said enclosure, said computer system module including a second electrical connector releasably connected to one of said first electrical connectors, said computer system module further including software and hardware for performing a vehicle function.

25. The vehicle computer system of claim 24 further comprising a plurality of computer system modules releasably mounted in said enclosure, each computer system module including a second electrical connector releasably connected to one of said first electrical connectors, each computer system module further including software and hardware for performing a vehicle function.

* * * * *

UNITED STATES PATENT AND TRADEMARK OFFICE
CERTIFICATE OF CORRECTION

PATENT NO. : 6,411,884 B1 Page 1 of 1
DATED : June 25, 2002
INVENTOR(S) : Richard Joseph Chutorash It is certified that error appears in the above-identified patent and that said Letters Patent is hereby corrected as shown below:

Column 4,
Line 5, after "connector, second occurrence, insert -- being --;
Line 29, delete "An Enclosure for a" and insert -- The -- therefor,
Lines 29-30, after "system" delete "module as recited in";
Line 30, before "claim 5" insert -- of --;
Line 31, after "keypad" delete ", said keypad";

Column 5,
Line 23, after "display" insert -- connected to a keypad --;

Column 6,
Line 3, after "comprising" delete "as" and insert -- an --.

Signed and Sealed this

Twenty-sixth Day of November, 2002

*Attest:*

JAMES E. ROGAN
*Attesting Officer* *Director of the United States Patent and Trademark Office*